US011285883B2

(12) United States Patent
Paunov

(10) Patent No.: US 11,285,883 B2
(45) Date of Patent: Mar. 29, 2022

(54) CLUTCH ASSEMBLY FOR DROP-DOWN UTILITY RACK

(71) Applicant: Ranger Design, Montreal (CA)

(72) Inventor: Iiko Paunov, Montreal (CA)

(73) Assignee: Ranger Design, Montreal (CA)

( * ) Notice: Subject to any disclaimer, the term of this patent is extended or adjusted under 35 U.S.C. 154(b) by 231 days.

(21) Appl. No.: 16/779,272

(22) Filed: Jan. 31, 2020

(65) Prior Publication Data
US 2020/0247326 A1    Aug. 6, 2020

Related U.S. Application Data

(60) Provisional application No. 62/799,707, filed on Jan. 31, 2019.

(51) Int. Cl.
*B60R 9/045*    (2006.01)
*B60R 9/042*    (2006.01)

(52) U.S. Cl.
CPC ............ *B60R 9/045* (2013.01); *B60R 9/0423* (2013.01)

(58) Field of Classification Search
CPC ........... B60R 9/045; B60R 9/042; B60R 9/04; E06C 5/16
See application file for complete search history.

(56) References Cited

U.S. PATENT DOCUMENTS

| | | | | |
|---|---|---|---|---|
| 2,551,351 A | * | 5/1951 | Swenson | B60P 3/1025 414/462 |
| 3,013,681 A | * | 12/1961 | Garnett | B60P 3/14 280/4 |
| 3,904,094 A | * | 9/1975 | Correll | B60R 9/0485 224/324 |
| 4,008,838 A | * | 2/1977 | Correll | B60R 9/0485 224/315 |
| 4,170,331 A | * | 10/1979 | Faulstich | E06C 5/24 182/127 |
| 4,262,834 A | * | 4/1981 | Nutt | B60R 9/0485 182/127 |
| 5,058,791 A | * | 10/1991 | Henriquez | B60R 9/0423 224/310 |
| 5,398,778 A | * | 3/1995 | Sexton | B60R 9/0423 182/127 |
| 5,782,391 A | * | 7/1998 | Cretcher | B60R 9/042 224/310 |
| 6,092,972 A | * | 7/2000 | Levi | B60R 9/0423 224/310 |

(Continued)

*Primary Examiner* — Brian D Nash
(74) *Attorney, Agent, or Firm* — William H. Honaker; Dickinson Wright PLLC

(57) ABSTRACT

Disclosed is a drop-down utility rack that has a rotating bar for controlling the position of the utility rack between a transport position and an access position. The rotating bar rotates through an arc of rotation which moves the rack between the transport and access positions. A lever is connected to the rotating bar for rotating the rotating bar. The lever is adapted to move through an arc of travel. A clutch is mounted between the lever and the rotating bar. The clutch engages and disengages the lever and the rotating bar such that the lever rotates through the arc of travel to rotate the rotating bar over a portion of the arc of rotation. The clutch automatically disengages the lever from the rotating bar as the rotating bar completes its arc of rotation. In this way, the arc of travel is less than the arc of rotation.

20 Claims, 14 Drawing Sheets

(56) References Cited

U.S. PATENT DOCUMENTS

| | | | | |
|---|---|---|---|---|
| 6,099,231 A * | 8/2000 | Levi | ...................... | B60R 9/0423 |
| | | | | 224/310 |
| 6,283,310 B1 * | 9/2001 | Dean | ....................... | B60R 9/048 |
| | | | | 211/17 |
| 6,360,930 B1 * | 3/2002 | Flickenger | ............ | B60R 9/0423 |
| | | | | 118/314 |
| 6,427,889 B1 * | 8/2002 | Levi | ...................... | B60R 9/0423 |
| | | | | 224/310 |
| 6,457,557 B1 * | 10/2002 | Anderson | ................. | E06C 5/00 |
| | | | | 182/129 |
| 9,132,780 B2 * | 9/2015 | Sautter, Jr. | ............ | B60R 9/0423 |
| 9,327,654 B2 * | 5/2016 | Richter | ................. | B60R 9/0423 |
| 9,694,756 B2 * | 7/2017 | Pullman | ................ | B60R 9/0423 |
| 9,987,995 B2 * | 6/2018 | Paunov | ................ | B60R 9/0423 |
| 2002/0090285 A1 * | 7/2002 | Levi | .......................... | E06C 5/00 |
| | | | | 414/462 |
| 2003/0175101 A1 * | 9/2003 | Levi | ..................... | B60R 9/0423 |
| | | | | 414/462 |
| 2007/0007316 A1 * | 1/2007 | Witczak | ................. | B60R 9/042 |
| | | | | 224/310 |
| 2007/0175936 A1 * | 8/2007 | Goyanko | ................ | B60R 9/042 |
| | | | | 224/309 |
| 2009/0140021 A1 * | 6/2009 | Richter | ..................... | E06C 5/04 |
| | | | | 224/310 |
| 2013/0334267 A1 * | 12/2013 | Sautter, Jr. | ................ | B60R 9/04 |
| | | | | 224/324 |
| 2014/0217140 A1 * | 8/2014 | Kramer | .................. | B60R 11/06 |
| | | | | 224/484 |
| 2016/0137139 A1 * | 5/2016 | Levi | ..................... | B60R 9/0485 |
| | | | | 224/309 |

* cited by examiner

CLUTCH ASSEMBLY FOR DROP-DOWN UTILITY RACK

RELATED APPLICATIONS

This application claims the benefit of U.S. Provisional Application Ser. No. 62/799,707, filed Jan. 31, 2019, which is incorporated herein by way of reference in its entirety.

TECHNICAL FIELD

This invention relates generally to a drop-down utility rack for vehicles, and more particularly to an actuated drop-down utility rack.

BACKGROUND OF THE INVENTION

Many types of operations require utility took to be transported on a vehicle. When a particular job requires a utility tool, the operator can remove the tool from the vehicle.

While various utility tools can be transported, larger dimensioned tools, such as ladders, represent a particular challenge due their size. For smaller vehicles, such as utility vans or trucks, a preferred way of transporting a ladder is to use a ladder rack mounted onto the roof of the vehicle. Since the roof of the vehicle can be taller than the operator, removing the mounted ladder can be troublesome. For example, these troubles include an operator having to remove the ladder through two stages of movement, wherein the operator must stand beneath the descending ladder during the removal. Furthermore, in some cases, the operator must reach over his/her head and exert an upper movement in order to mount the ladder back onto the roof of the vehicle. In yet other cases, only one end of the ladder is lowered for dismounting, resulting in the ladder being lowered at an angle.

Ladder storing assemblies of the type to which the subject invention pertains are used for storing a ladder on top of a vehicle and are movable to a position on the side of the vehicle for loading and unloading the ladder. Such an assembly is illustrated in U.S. Pat. No. 3,013,681 to Garnett wherein a first drop-down arm is slidably connected to a base frame attached to the top of a vehicle for movement between a stored position on top of the vehicle and a release position on a side of the vehicle. Another example is assignee's patent EP 2,961,639. This ladder storing assembly allows the ladder to be moved from the top of the vehicle to the side of the vehicle with the operator standing at the back of the vehicle. All control of the assembly is done with the operator positioned out of the way of the moving assembly. The operator controls the assembly from an attached lever. The operator moves the lever through an angle either counterclockwise or clockwise to move the assembly between the raised and lowered positions.

Although this assembly works well, there is a desire to reduce the amount of movement required by the operator when pivoting the lever.

SUMMARY OF THE INVENTION

In general terms, this invention provides a drop-down utility rack that has a rotating bar for controlling the position of the utility rack between a transport position and an access position. The rotating bar rotates through an arc of rotation which moves the rack between the transport and access positions. A lever is connected to the rotating bar for rotating the rotating bar. The lever is adapted to move through an arc of travel.

A clutch is mounted between the lever and the rotating bar. The clutch engages and disengages the lever and the rotating bar such that the lever rotates through the arc of travel to rotate the rotating bar over a portion of the arc of rotation. The clutch automatically disengages the lever from the rotating bar as the rotating bar completes its arc of rotation. In this way, the arc of travel is less than the arc of rotation.

The clutch engages the lever and the rotating bar to allow the lever to rotate through its arc of travel and rotate the rotating bar through a portion of the arc of rotation. The clutch automatically disengages the lever and the rotating bar after the rotating bar has rotated more than a portion of the arc of rotation. In the disclosed embodiment, the portion of the arc of rotation is more than one half the arc of rotation, but it will be understood that less than one half or exactly one half would also work. For example, the use of an assist spring, pneumatic cylinder, or counterweight would allow the arc of rotation to be less than or equal to one half the overall arc of rotation. This will also reduce the arc of travel.

In the disclosed embodiment, the lever or rotating bar has a window with opposed sides and the other of the rotating bar or lever has a projecting member extending between the opposed sides. The projecting member contacts one of the sides to rotate the lever and rotating bar together. The rotating bar freely rotates with respect to the lever when the projecting member is between the sides.

Further, in the disclosed embodiment, the window extends through opposed walls of the lever. The rotating bar is received within the lever. The clutch further includes a key extending through the rotating bar and into the window. A slot is formed in the rotating bar with the key extending through the slot.

These and other features and advantages of this invention will become more apparent to those skilled in the art from the detailed description of a preferred embodiment. The drawings that accompany the detailed description are described below.

BRIEF DESCRIPTION OF THE DRAWINGS

Reference will now be made to the accompanying drawings, showing by way of illustration nor-limitative examples in which.

DETAILED DESCRIPTION OF A PREFERRED EMBODIMENT

Figure 1:
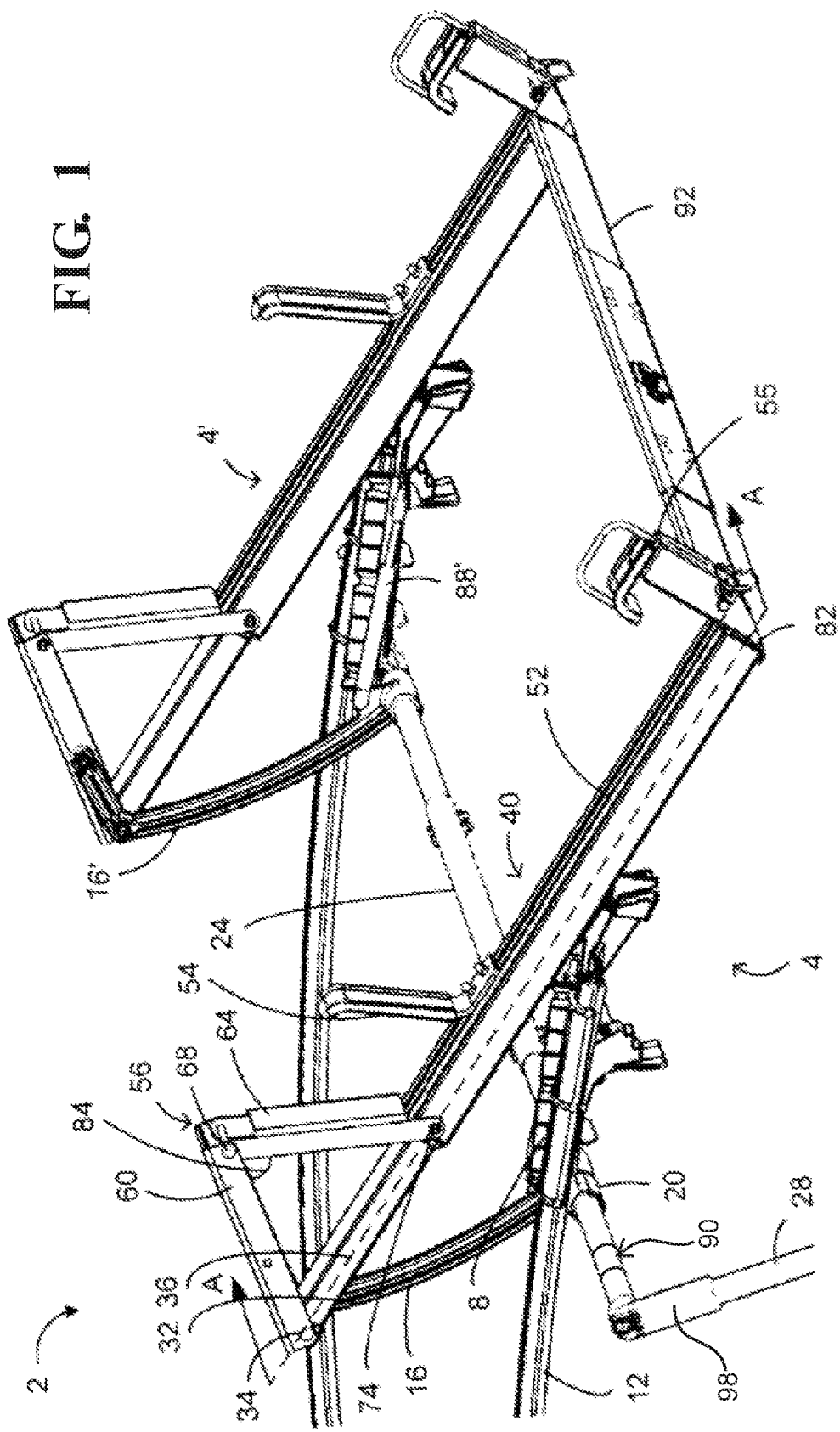
FIG. 1 is a perspective view of the drop-down utility rack in an intermediate position in accordance to one exemplary embodiment.
Figure 2:
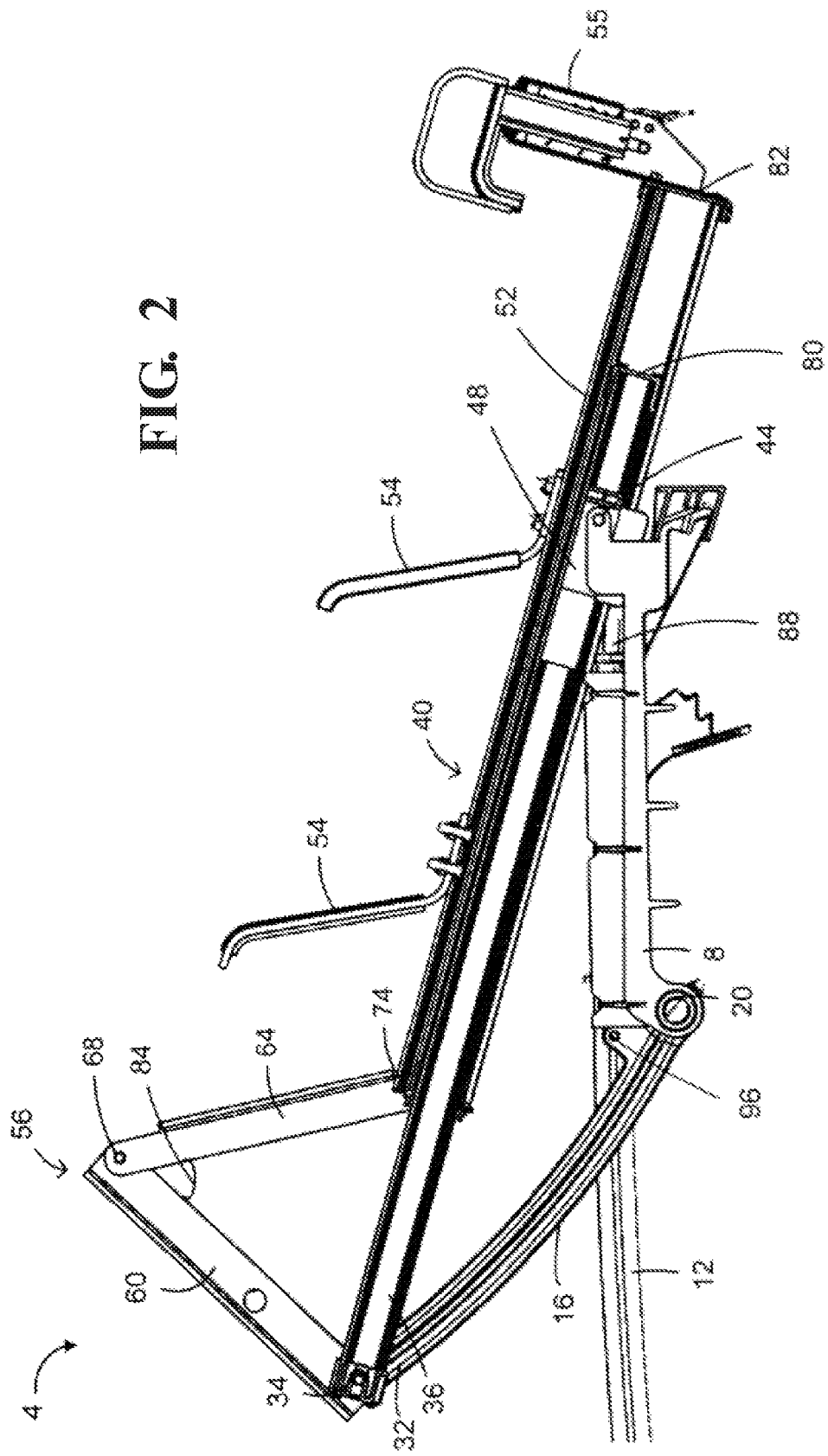
FIG. 2 is a cross-sectional view of the drop-down utility rack, taken along line A-A of FIG. 1, in an intermediate position in accordance to one exemplary embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. Furthermore, this description is not to be considered as limiting the scope of the embodiments described herein in any way but rather as merely describing the implementation of the various embodiments described herein.

Referring to FIGS. 1 to 4, therein illustrated are various views of an exemplary drop-down utility rack 2 in an intermediate position according to one exemplary embodiment. The drop-down utility rack 2 has a drop-down assembly 4 for at least partly supporting an item, such as a ladder 5. The drop-down assembly 4 has a base frame 8 for mounting the assembly 4 onto a roof rack 12 of a vehicle 14. The base frame 8 can be mounted onto an end region of the roof rack 12 proximate a side of the vehicle 14.

An actuating arm 16 is pivotally coupled at a first end to the base frame 8. According to various exemplary embodiments, the actuating arm 16 is pivotally coupled to the base frame 8 via a rotatable joint 20. The rotatable joint 20 is further coupled to a rotating bar 24 of the base frame 8, wherein rotation of the rotating bar 24 causes the actuating arm 16 to pivot. For example, the rotating bar 24 can be further coupled at one end to a lever 28. When the drop-down assembly 4 is mounted onto the roof rack of the vehicle 14, the lever 28 can extend downwardly from a roof 30 of the vehicle 14 such that an operator can easily access the lever 28 from the back of the vehicle 14. As a result, an operator can easily cause the actuating arm 16 to pivot.

The actuating arm 16 is pivotally coupled at a second end 32 to a coupled end 34 of a first member 36 of a variable-length arm 40. The first member 36 is further pivotally and slidably coupled to the base frame 8 to define a coupling point 44. The coupling point 44 is located at a position that is remote from the position defined by the coupling of the actuating arm 16 to the base frame 8. For example, the actuating arm 16 is coupled to a first end of the base frame 8 and the first member 36 is coupled to an opposite end of the base frame 8. Pivoting of the actuating arm 16 causes the first member 36 to be pivoted and slidably displaced about the coupling point 44.

The first member 36 is pivotally and slidably coupled to the base frame 8 via a guiding joint 48. The guiding joint 48 is pivotally coupled to the base frame 8 to define the coupling point 44 and to provide the pivotal motion of the first member 36. The guiding joint 48 guides the sliding displacement of the first member 36. For example, the guiding joint 48 can be internal to the first member 36.

Continuing with FIGS. 1 to 4, the variable-length arm 40 has a second member 52 that is slidably coupled to the first member 36. The sliding displacement of the second member 52 is guided by the first member 36. At least a portion of the length of the second member 52 overlaps with a portion of the first member 36.

According to various exemplary embodiments, the first member 36 and the second member 52 are arranged end-to-end and have an extendible member attached therebetween. For example, the extendible member could be a spring-loaded bellows or other similar assists.

According to various exemplary embodiments, the first member 36 and the second member 52 of the variable-length arm 40 have a telescoping relationship with respect to each other. For example, the first member 36 can be an internal member and the second member 52 is external to the first member 36.

At least one tool-retaining member 54 is coupled to a surface of the external member 52 of the telescoping arm 40. The tool-retaining member 54 can be any member that can support a tool to be transported. For example, the at least one tool-retaining member 54 includes support brackets attached to an upper surface of the external member 52 for supporting a portion of a ladder. For example, a first support bracket 54 can be located at a position intermediate the length of the external member 52. For example, a second support bracket 55 can be attached to an end of the external member 52. For example, the position of the tool-retaining member 54 can be adjustable to accommodate different objects to be supported. For example, different ladders having different widths can be supported within the support brackets. Furthermore, additional support brackets 54 can be attached to the external member 52 where required.

A compound linkage 56 couples the actuating arm 16 to the external member 52. The compound linkage 56 causes sliding displacement of the external member 52 in response to pivoting of the actuating arm 16.

According to various exemplary embodiments, the compound linkage 56 is an A-frame 56 formed of a first arm 60 and a pivotal arm 64. A first end of the arm 60 is pivotally joined by a pivotal joint 68 to a first end of the pivotal arm 64. A second end of the arm 60 opposite the pivotal joint 68 is fixedly coupled to the second end of the actuating arm 16. For example, the actuating arm 16 can have a transverse member and the arm 60 of the A-frame 56 is coupled to the actuating arm 16 via at least one point on the transverse member. The arm 60 forms an angle with the actuating arm 16 as the actuating arm 16 is pivoted. However, the arm 60 is rotated with the pivotal movement of the actuating arm 16. A second end of the pivotal arm 64 opposite the pivotal joint 68 is pivotally coupled to a coupled end 74 of the external member 52.

Figure 5:
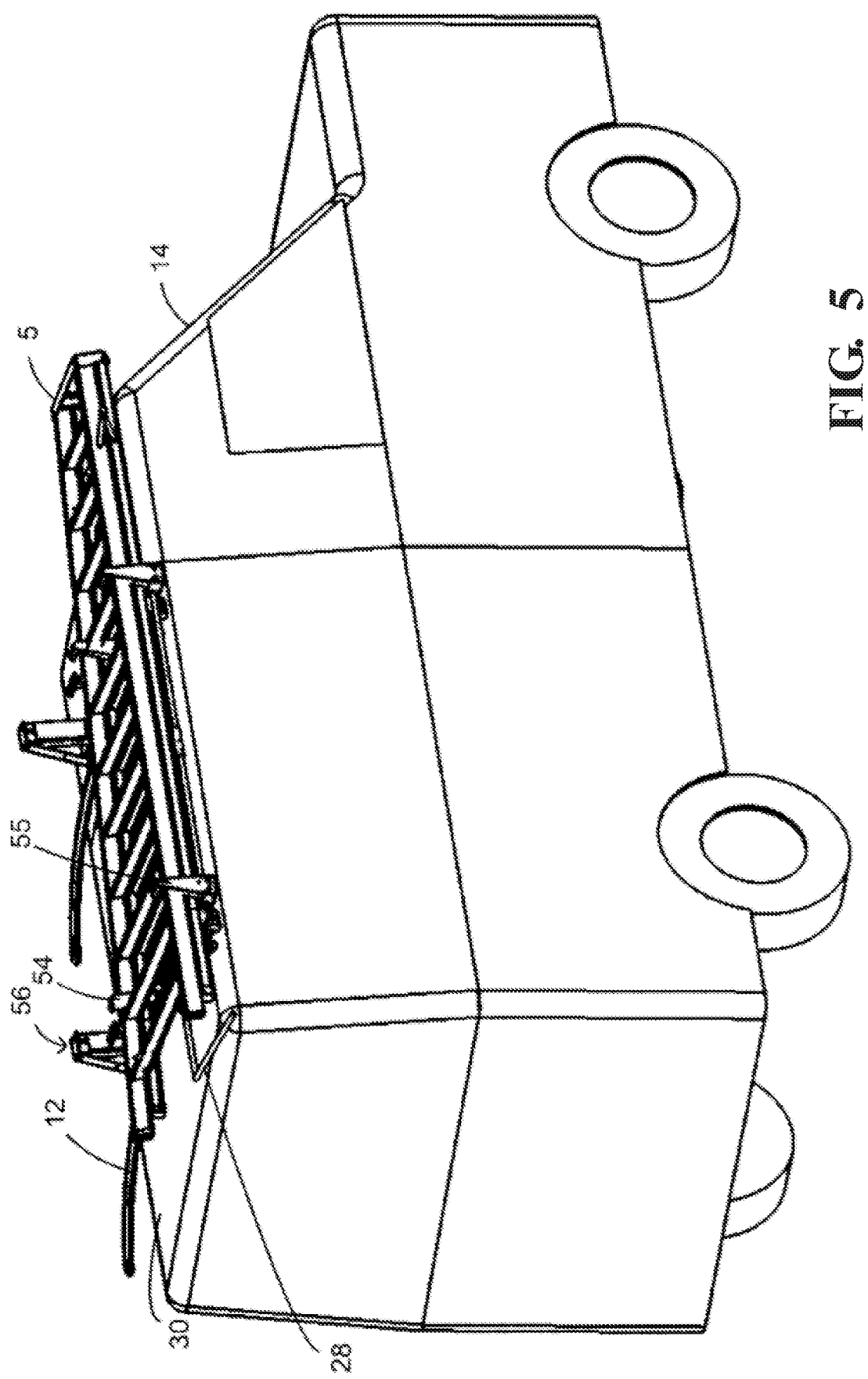
FIG. 5 is a perspective view of the drop-down utility rack in a tool transporting position in accordance to one exemplary embodiment installed on the roof of a vehicle and with a ladder positioned thereon.
Figure 6:
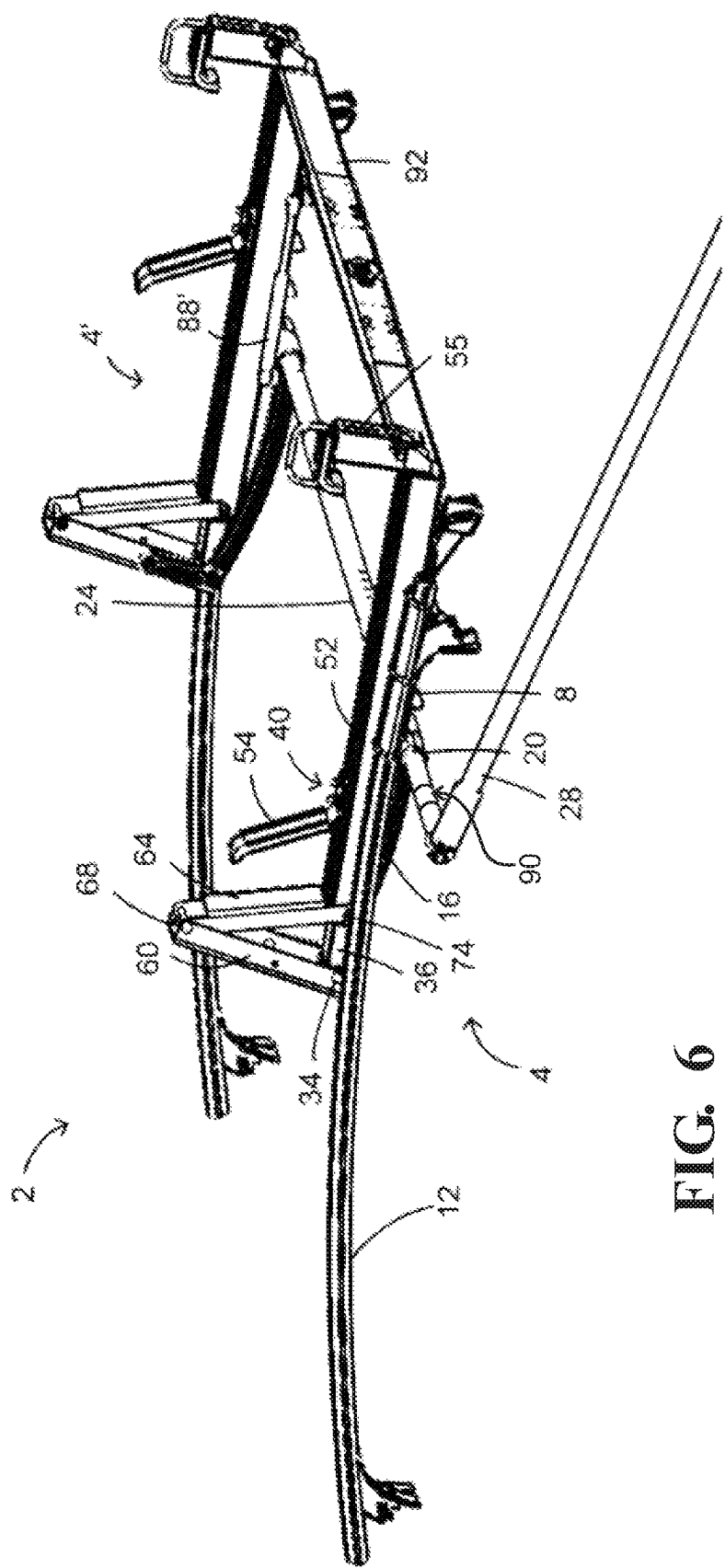
FIG. 6 is a perspective view of the drop-down utility rack in a tool transporting position in accordance to one exemplary embodiment.
Figure 7:
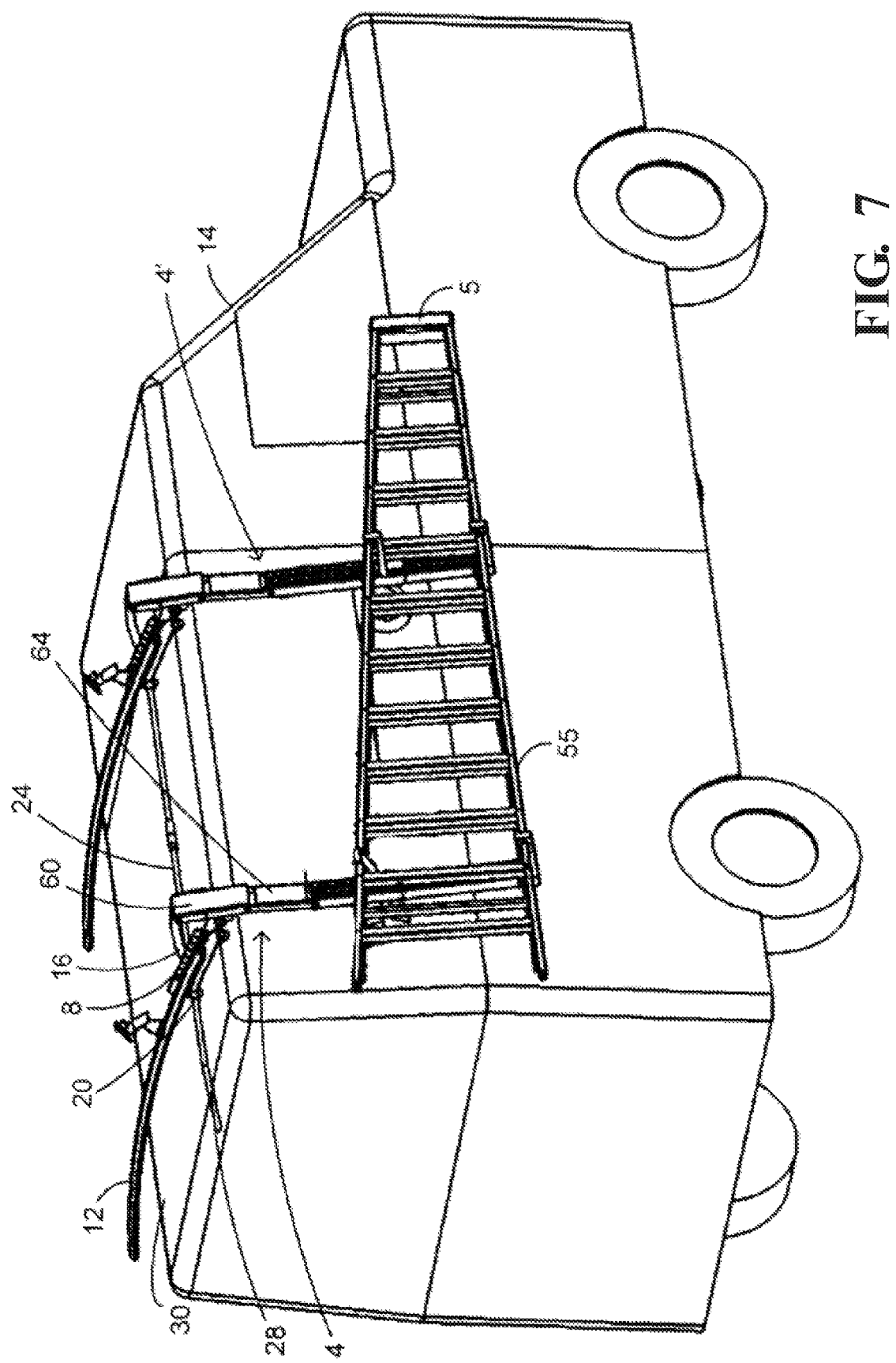
FIG. 7 is a perspective view of the drop-down utility rack in a tool access position in accordance to one exemplary embodiment installed on the roof of a vehicle and with a ladder positioned thereon.
Figure 8:
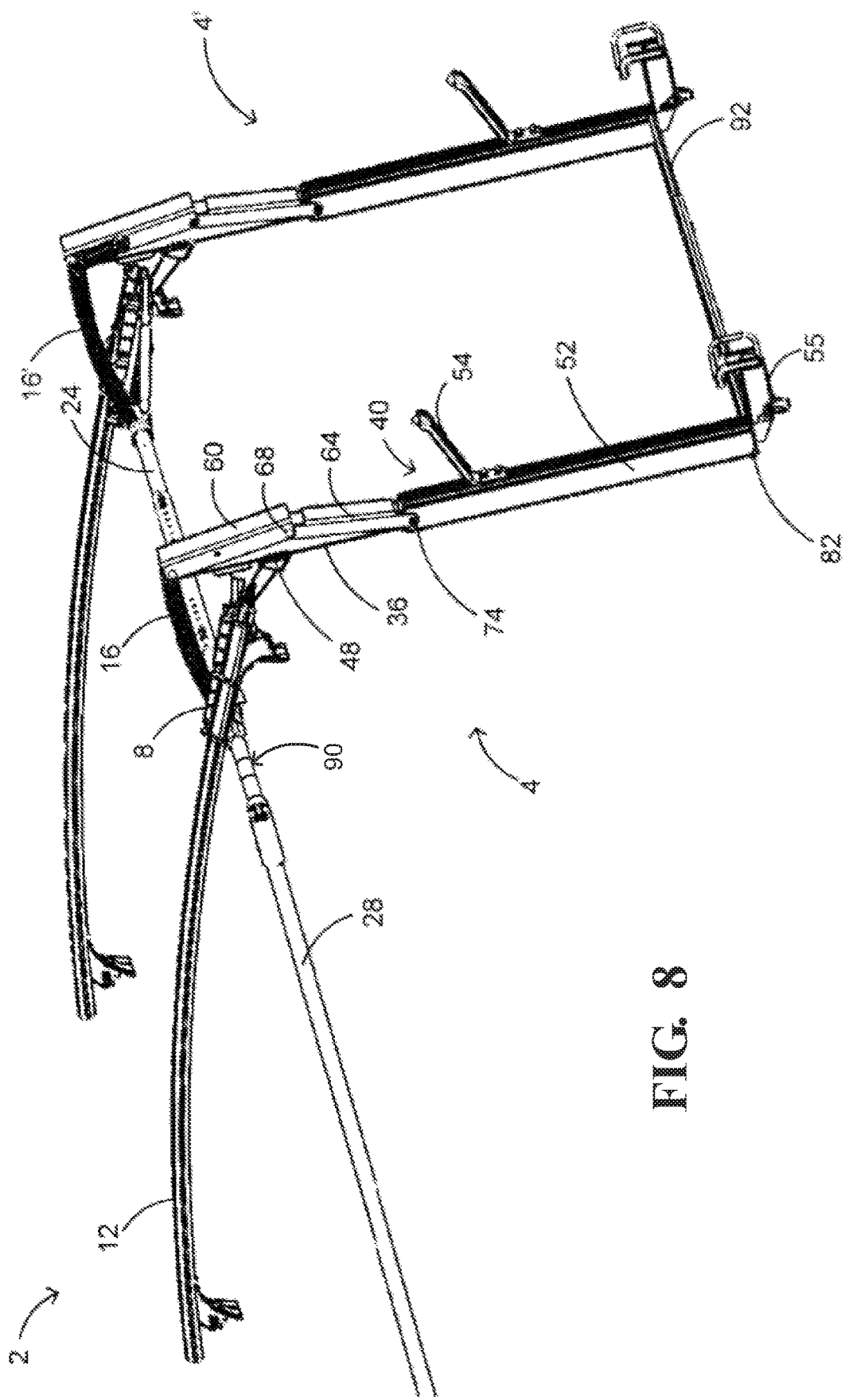
FIG. 8 is a perspective view of the drop-down utility rack in a tool access position in accordance to one exemplary embodiment.

Referring now to FIGS. 5 to 7, therein illustrated are various views of the exemplary drop-down utility rack 2 when the exemplary drop-down assembly 4 is in a tool transporting position. The actuating arm 16 is pivoted to a first position. For example, in the first position, the actuating arm 16 is pivoted to a generally reclined position. For example, in the reclined position, the actuating arm 16 can be generally aligned with the base frame 8. As shown in FIG. 6, when the drop-down assembly 4 is mounted onto a roof rack 12 of the vehicle 14, the actuating arm 16 can also be generally aligned with the roof rack 12 and the roof 30 of the vehicle 14. When the drop-down assembly 4 is in the transporting position, the internal member 36 can also be generally aligned with the base frame 8. When mounted onto a roof rack 12 of the vehicle 14, the internal member 36 can also be generally aligned with roof rack 12 and the roof 30 of the vehicle 14.

In the tool transporting position, the internal member 36 is displaced relative to the coupling point 44 such that the coupling point 44 is positioned along a lower portion of the internal member 36. For example, the coupling point 44 is positioned near a free end 80 of the internal member 36.

The external member 52 is also substantially aligned with the base frame 8. When mounted onto the roof rack 12 of the vehicle 14, the external member 52 is also substantially aligned with the roof rack 12 and the roof 30 of the vehicle 14. Furthermore, the external member 52 is in a retracted position relative to the internal member 36. In the retracted position, the external member 52 is displaced relative to the internal member 36 such that the external member 52 overlaps a significant portion of the internal member 36. For example, the external member 52 can overlap substantially an entire length of the internal member 36. For example, the free end 80 of the internal member 36 can be positioned near a free end 82 of the external member 52.

In the transporting position, the telescoping arm 40 is generally aligned with the base frame 8. When mounted onto the roof rack 12 of the vehicle 14, the telescoping arm 40 is generally aligned with the roof rack 12. It will be appreciated that the roof rack 12 is generally horizontal with the roof 30 of the vehicle 14. As a result, the telescoping arm 40 is also generally horizontal with the roof 30 of the vehicle 14. For example, when a ladder 5 is being transported, the ladder 5 will also be supported horizontally by the support brackets 54 of the telescoping arm 40. It will be appreciated that the horizontal position of the ladder 5 provides stability during transportation with the vehicle 14.

According to exemplary embodiments where the actuating arm 16 is coupled to the external member 52 of the telescoping arm 40 via the A-frame 56, the A-frame 56 is in a closed position when the drop-down assembly 4 is in a transporting position. In the closed position, the arm 60 and pivotal arm 64 of the A-frame 56 define an angle 84. For example, the angle 84 is an acute angle. It will be appreciated that a small angle 84 of the A-frame causes the external member 52 to overlap a significant portion of the internal member 36. For example, the angle 84 is sufficiently small to allow the external member 52 to substantially overlap the entire length of the internal member 36. In one exemplary embodiment, the arm 60 can be at least partially overlapping with pivotal arm 64.

In the transporting position, the guiding joint 48 restricts movement of the telescoping arm 40 relative to the base frame 8. For example, the guiding joint 48 restricts movement of the telescoping arm 40 in a direction perpendicular to the base frame 8. For example, when the drop-down assembly 4 is mounted onto the roof rack 12 of the vehicle 14, the guiding joint 48 restricts movement of the telescoping arm 40 in an up-down direction relative to the roof 30 of the vehicle 14. Restricting the movement of the telescoping arm 40 in the up-down direction further restricts the pivotal movement of the actuating arm 16 about the pivot point 20, thereby reducing stress on the actuating arm 16. Restricting the movement of the telescoping arm 40 further reduces forces on the tools supported by the drop-down assembly 4.

Referring back to FIGS. 1 to 4 in the intermediate position, the actuating arm 16 has been pivoted away from its reclined position. For example, the actuating arm 16 is at an inclined position relative to the base frame 8. When mounted onto a roof rack 12 of the vehicle 14, the actuating arm 16 is also at an inclined position relative to the roof rack 12. For example, the actuating arm 16 is pivoted from the reclined position to the intermediate position by rotating the lever 28 to cause the rotating bar 24 to rotate. For example, the lever 28 is rotated in a clockwise motion.

As a result of the pivoting of the actuating arm 16, the internal member 36 is also pivoted away from the base frame 8. For example, the internal member 36 is at an inclined position relative to the base frame 8. Since the coupling point 44 is located at a position that is remote from the position defined by the coupling of the actuating arm 16 to the base frame 8, the center of rotation of the pivoting movement of the actuating arm 16 is not the same as the center of rotation of the pivoting movement of the internal member 36. As the actuating arm 16 is pivoted away from its reclined position, it exerts a force on the internal member 36. In particular, the force exerted on the internal member 36 has a non-zero component in the direction of the length of the internal member 36. Pivotal movement of the actuating arm 16 away from its reclined position causes the internal member 36 to be slidably displaced in the direction of the free end 82 of the external member 52 of the telescoping arm 40. The coupling point 44 is displaced relative to the internal member 36 in the direction of the coupled end 34 of the internal member 36.

As a result of the pivoting of the actuating arm 16, external member 52 is also pivoted away from base frame 8. It will be appreciated that the external member 52 is at an inclined position relative to the base frame 8. Since the external member 52 overlaps the internal member 36, the external member 52 has the same axis of rotation as the internal member 36. Both the external member 52 and the internal member 36 rotate about the coupling point 44. Since the coupling point 44 is located at a position that is remote from the position defined by the coupling of the actuating arm 16 to the base frame 8, the center of rotation of the pivoting movement of the actuating arm 16 is not the same as the center of rotation of the pivoting movement of the external member 52. As the actuating arm 16 is pivoted away from its reclined position, it exerts a force on the external member 52 through the compound linkage 56. In particular, the force exerted on the external member 52 has a non-zero component in the direction of the length of the external member 52. Pivotal movement of the actuating arm 16 away from its closed position causes the external member 52 to be slidably displaced in the direction away from the coupled end 34 of the internal member 36.

The actuating arm 16 can be pivoted from its first position to a second position. For example, in the second position the actuating arm 16 is substantially upright. For example, in the second position the actuating arm 16 is perpendicular to the base frame 8.

According to various exemplary embodiments, over at least a portion of the pivotal movement of the actuating arm 16 from its reclined position to the upright position, the sliding displacement of the internal member 36 relative to the coupling point 44 occurs simultaneously with the sliding displacement of the external member 52 relative to the internal member 36.

Over at least a portion of the pivotal movement of the actuating arm 16 from the reclined position to the upright position, the force exerted on the external member 52 through the compound linkage 56 is greater than the force exerted on the internal member 36. Over this portion of pivotal movement, for the same movement of the actuating arm 16, the rate of displacement of the external member 52 relative to the internal member 36 is greater than the rate of displacement of the internal member 36 relative to the coupling point 44. As a result, the external member 52 is slidably displaced relative to the internal member 36. The free end 82 of the external member 52 is displaced away from the free end 80 of the internal member 36. The overall length of the telescoping arm 40 is increased as a result of the displacement of the external member 52 relative to the internal member 36.

As the actuating arm 16 is pivoted away from its reclined position, the arm 60 exerts a force on the pivotal arm 64 through the pivotal joint 68. The force exerted by the arm 60 causes the pivotal arm 64 to be rotated about the pivotal joint 68 away from the arm 60. As a result, the angle 84 defined by the arm 60 and the pivotal arm 64 is increased as the actuating arm 16 is pivoted. As the actuating arm 16 is pivoted away from the closed position, and as a result of the force exerted by the arm 60, the pivotal arm 64 further exerts a force on the external member 52. It will be understood that the force exerted by the pivotal arm 64 on the external member 52 corresponds to the force exerted on the external member 52 through the compound linkage 56 described herein.

Referring now to FIGS. 7 to 10, therein illustrated are various views of the exemplary drop-down utility rack 2 wherein the exemplary drop-down assembly 4 is in a tool access position. The actuating arm 16 is pivoted to its final position. For example, as shown, the actuating arm 16 has rotated to a position that is nearly 180 degrees from the starting reclining position. When mounted onto the roof rack 12 of the vehicle 14, the actuating arm 16 angled at an acute angle to the roof rack 12.

When the drop-down assembly 4 is in the tool access position, the telescoping arm 40 is inclined in relation to the base frame 8. For example, the telescoping arm 40 extends downwardly over a side of vehicle 14. Furthermore, the telescoping arm 40 reaches an extended position.

Figure 9:
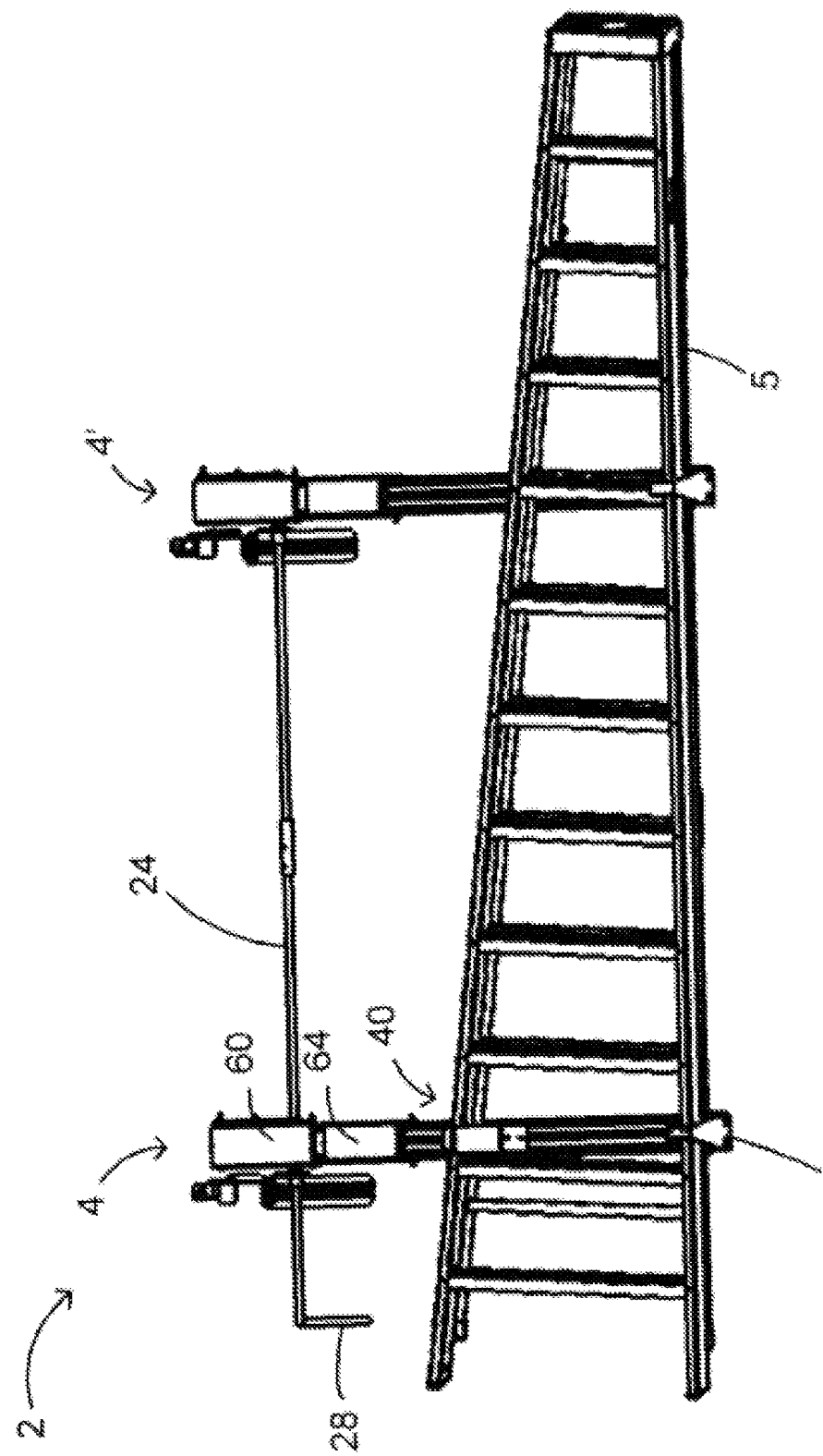
FIG. 9 is a front elevation view of the drop-down utility rack in a tool access position in accordance to one exemplary embodiment having a ladder positioned thereon.
Figure 10:
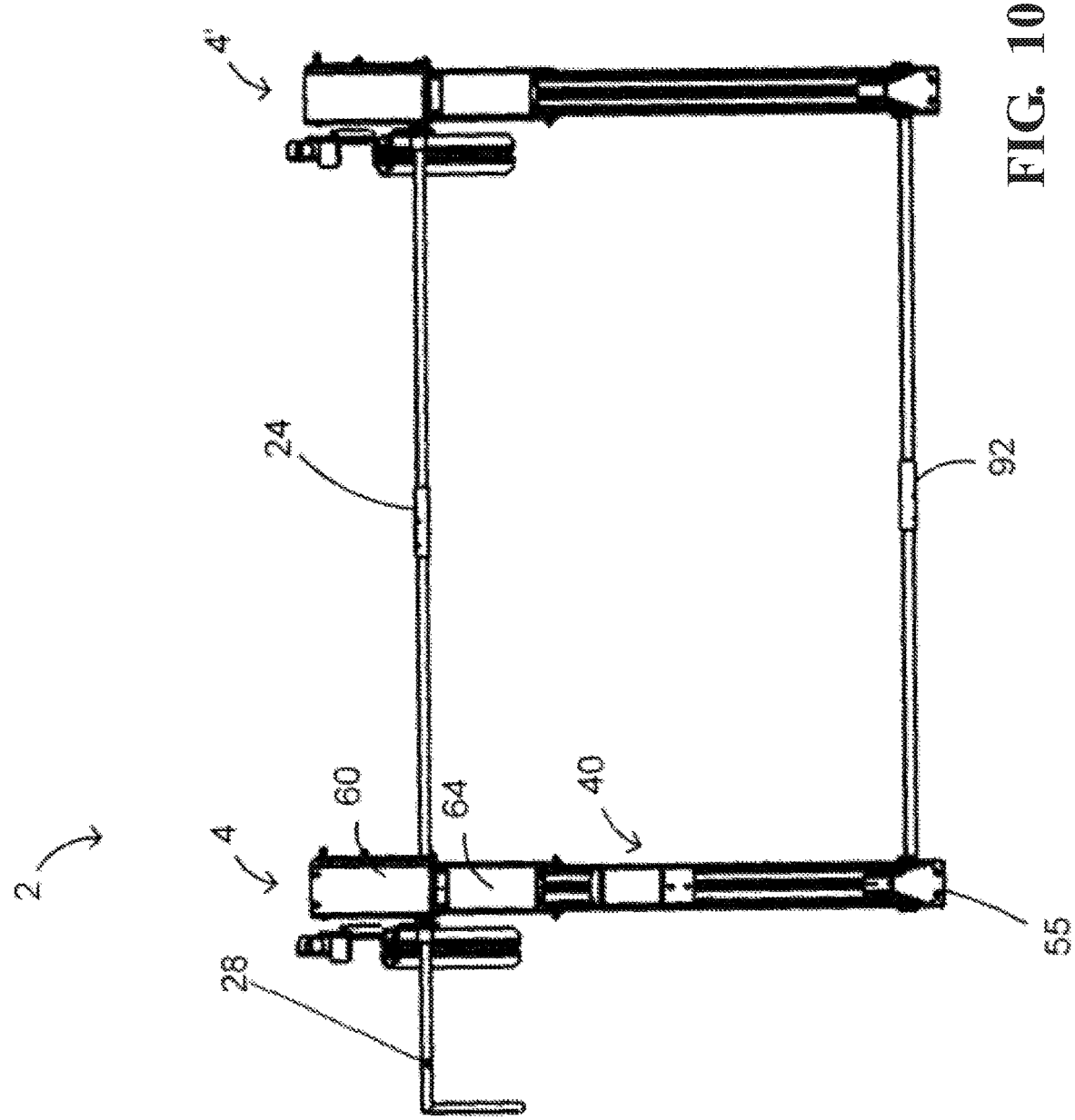
FIG. 10 is a front elevation view of the drop-down utility rack in a tool access position in accordance to one exemplary embodiment.

When the telescoping arm 40 is in the extended position, the internal member 36 is inclined in relation to the base frame 8. As shown in FIG. 9, when mounted onto the roof rack 12 of the vehicle 14, the internal member 36 is transverse to the roof rack 12 and the roof 30 of the vehicle 14 and is substantially vertical on the side of the vehicle 14. The internal member 36 has been displaced relative to the coupling point 44 such that the coupling point 44 is positioned along an upper portion of the internal member 36. For example, the coupling point 44 is positioned near a coupled end 34 of the internal member 36 near the actuating arm 16.

When the telescoping arm 40 is in the extended position, the external member 52 is also inclined in relation to the base frame 8. When mounted onto the roof rack 12 of the vehicle 14, the external member 52 is transverse to the roof rack 12 and the roof 30 of the vehicle 14 and is substantially vertical on the side of the vehicle 14. The external member 52 has been displaced relative to the internal member 36 such that the coupled end 74 of the external member 52 is positioned near the free end 80 of the internal member 36. The external member 52 has been displaced relative to the internal member 36 such that a significant portion of the internal member 36 is exposed and a reduced portion of the internal member 36 overlaps the external member 52. It will be appreciated that in the extended position, the telescoping arm 40 has a significantly greater length than its length when it is in the retracted position.

When the drop-down utility rack 2 is mounted onto the vehicle 14 and the drop-down assembly 4 is in its tool access position, the external member 52 extends downwardly from the internal member 36. The telescoping arm 40 extends downwardly from the roof 30 of the vehicle 14. The support bracket 54 of the telescoping arm 40 is lowered from the roof 30 and is positioned on the side of the vehicle 14. The telescoping arm 40 can be generally aligned with a side of the vehicle 14. Alternatively, the telescoping arm 40 can be at a slight incline relative to the side of the vehicle 14. As a result, a tool being at least partially supported within the support bracket 54 is also lowered from the roof 30 and positioned on the side of the vehicle 14. It will be appreciated that a tool being in a lowered position allows an operator to easily access this tool, such as the ladder 5 or other tools, being supported by the drop-down utility rack 2.

According to various exemplary embodiments where the compound linkage 56 is an A-frame formed of the arm 60 and the pivotal arm 64, the A-frame 56 is in an open position when the drop-down assembly 4 is in a tool access position. In the open position, the pivotal arm 64 has been rotated away from the arm 60 to define an obtuse angle 84. According to various exemplary embodiments, the arm 60 and the pivotal arm 64 can be generally aligned such that the angle 84 approaches 180°.

The drop-down assembly 4 can be returned from the tool access position to the tool transporting position through pivotal movement of the actuating arm 16 from its upright position back to its reclined position. For example, the actuating arm 16 is pivoted from the upright position back to its reclined position by rotating the lever 28 to cause the rotating bar 24 to rotate. For example, the lever 28 is rotated in a counterclockwise motion.

As a result of the pivoting of the actuating arm 16, the internal member 36 is also pivoted. As the actuating arm 16 is pivoted towards its reclined position, it exerts a force on the internal member 36. In particular, the force exerted on the internal member 36 has a non-zero component in the direction of the length of internal member 36. The pivotal movement of the actuating arm 16 towards its reclined position causes the internal member 36 to be slidably displaced in a direction away from the free end 82 of the external member 52 of the telescoping arm 40. The coupling point 44 is displaced relative to the internal member 36 in the direction of the free end 80 of the internal member 36.

As a result of the pivoting of the actuating arm 16, the external member 52 is also pivoted. As the actuating arm 16 is pivoted towards its reclined position, it exerts a force on the external member 52 through the compound linkage 56. In particular, the force exerted on the external member 52 has a non-zero component in the direction of the length of the external member 52. The pivotal movement of the actuating arm 16 towards its reclined position causes the external member 52 to be slidably displaced in a direction towards the coupled end 34 of the internal member 36.

Over at least a portion of the pivotal movement of the actuating arm 16 from the closed position to the open position, the force exerted on the external member 52 through the compound linkage 56 is greater than the force exerted on the internal member 36. Over this portion of pivotal movement, for the same movement of the actuating arm 16, the rate of displacement of the external member 52 relative to the internal member 36 is greater than the rate of displacement of the internal member 36 relative to the coupling point 44. As a result, the external member 52 is slidably displaced relative to the internal member 36. The free end 82 of the external member 52 is displaced towards the internal member 36. The overall length of the telescoping arm 40 is decreased as a result of the displacement of the external member 52 relative to the internal member 36.

According to various exemplary embodiments where the compound linkage 56 is an A-frame formed of the arm 60 and the pivotal arm 64, the arm 60 rotates with the pivotal movement of the actuating arm 16. As the actuating arm 16 is pivoted towards its reclined position, the arm 60 exerts a force on the pivotal arm 64 through the pivotal joint 68. The force exerted by the arm 60 causes the pivotal arm 64 to be rotated about the pivotal joint 68 towards the arm 60. As a result, the angle 84 defined by the arm 60 and pivotal arm 64 is decreased as the actuating arm 16 is pivoted towards its reclined position. As the actuating arm 16 is pivoted towards its reclined position, and as a result of the force exerted by the arm 60, the pivotal arm 64 further exerts a force on the external member 52. It will be understood that the force exerted by the pivotal arm 64 on external member 52 corresponds to the force exerted on the external member 52 through the compound linkage 56 described herein.

For example, due to the telescoping arm 40 entering the extended position and due to a small portion of the internal member 36 overlapping with the external member 52, the internal member 36 can become misaligned with the external member 52. According to various exemplary embodiments, guiding joint 48 provides re-alignment of the internal member 36 with the external member 52 as the telescoping arm 40 is shifted from its extended position back to its retracted position.

It will be appreciated that by providing a pivotal and slidable coupling of the internal member 36 to the base frame 8, a saving is achieved in the space required for the internal member 36 to complete its full range of motion. For example, where the internal member 36 is only pivotally coupled to the base frame 8, the entire length of the internal member 36 would be pivoting. By contrast, according to exemplary embodiments described herein, the length of the internal member 36 being rotated on one side of the coupling point 44 is decreased due to the sliding displacement of the internal member 36 relative to the coupling point 44. Similarly, the sliding displacement of the external member 52 relative to the internal member 36 reduces the length of the external member 52 that must be rotated. Overall, the sliding motions of the internal member 36 and external member 52 allow the length of the telescoping arm 40 to be shortened, thereby providing a reduction in the space required by the drop-down assembly 4.

It will be appreciated that the space required for the drop-down assembly 4 to complete its full range of motions between the tool transporting position and the tool access position is defined by the pivoting of the actuating arm 16 and the compound linkage 56. Advantageously, the sliding motions of the internal member 36 and external member 52 of the telescoping arm 40 allow the length of the actuating arm 16 to be shortened, thereby also providing a reduction in the space required for the drop-down assembly 4 to complete its motion between the tool transporting position and the tool access position. In particular, the space required above the vehicle 14 is reduced. For example, the reduction in space required becomes important when the drop-down assembly 4 is to be operated in a location with overhead space restrictions, such as with a garage having a low ceiling.

According to various exemplary embodiments, the drop-down assembly 4 further has an actuator 88. A stationary portion of the actuator 88 is coupled to the base frame 8. An actuated portion of the actuator 88 can be coupled to the actuating arm 16 to assist the pivoting of the actuating arm 16. For example, the actuated portion of the actuated arm is coupled to the actuating arm at a coupling point 96 remote from the axis of pivot 20 of the actuating arm 16. For example, the actuator 88 may be a spring-loaded shock absorber, electric actuator or hydraulic actuator.

According to one exemplary embodiment, the actuator 88 assists the pivotal movement of the actuating arm 16 from its reclined position to its upright position. In particular, the actuator 88 applies a force on the actuating arm 16 from the base frame 8 in a direction opposite the pivotal movement of the actuating arm 16 to restrict the movement of the actuating arm 16. It will be appreciated that the forced applied by the actuator 88 on the actuating arm 16 restricts the rotational velocity of the actuating arm 16. Restricting the velocity of the movement of the actuating arm 16 ensures smooth displacement of the internal member 36, external member 52, and compound linkage 56. In particular, it ensures smooth sliding displacement of the external member 52 relative to the internal member 36.

According to one exemplary embodiment, the actuator 88 assists the pivotal movement of the actuating arm 16 from its upright position to its reclined position. In particular, the actuator 88 applies a force on the actuating arm 16 from the base frame 8 in the same direction as the pivotal movement of the actuating arm 16 towards its reclined position. The assisting force from the actuator 88 assists in causing the telescoping arm 40 to return to its retracted position. For example, movement of the internal member 36 relative to the coupling point 44 is assisted. Similarly, movement of the external member 52 towards the coupling end of the internal member 36 is also assisted.

According to various exemplary embodiments, the drop-down utility rack 2 has two similar drop-down assemblies 4 and 4'. The first drop-down assembly 4 is attached to a first track of the roof rack 12 of the vehicle 14. The second drop-down assembly 4' is attached to a second track of the roof rack 12 the vehicle 14. For example, the first track and the second track are parallel and spaced apart in a front to back direction of the vehicle 14. Accordingly, the first drop-down assembly 4 and the second drop-down assembly 4' are also spaced apart along the length of the vehicle 14. For example, the first drop-down assembly 4 can support a first portion of the ladder 5 and the second drop-down assembly 4' can support a second portion of the ladder 5.

For example, the first drop-down assembly 4 and the second assembly 4' can be attached together via a transverse support bar 92. For example, the transverse support bar 92 can be telescoping to have a variable length. The length of the transverse support bar 92 can be adjusted according to the distance between the first drop-down assembly 4 and the second drop-down assembly 4'.

For example, the actuating arm 16 and actuating arm 16' of the second assembly 4' can be attached to the same rotating bar 24. For example, the rotating bar 24 can be telescoping to have a variable length. The length of the rotating bar can be adjusted according to the distance between the first drop-down assembly 4 and second drop-down assembly 4'. For example, the second assembly 4' also has a respective actuator 88' for assisting pivotal movement of the second actuating arm 16'.

Figure 11:
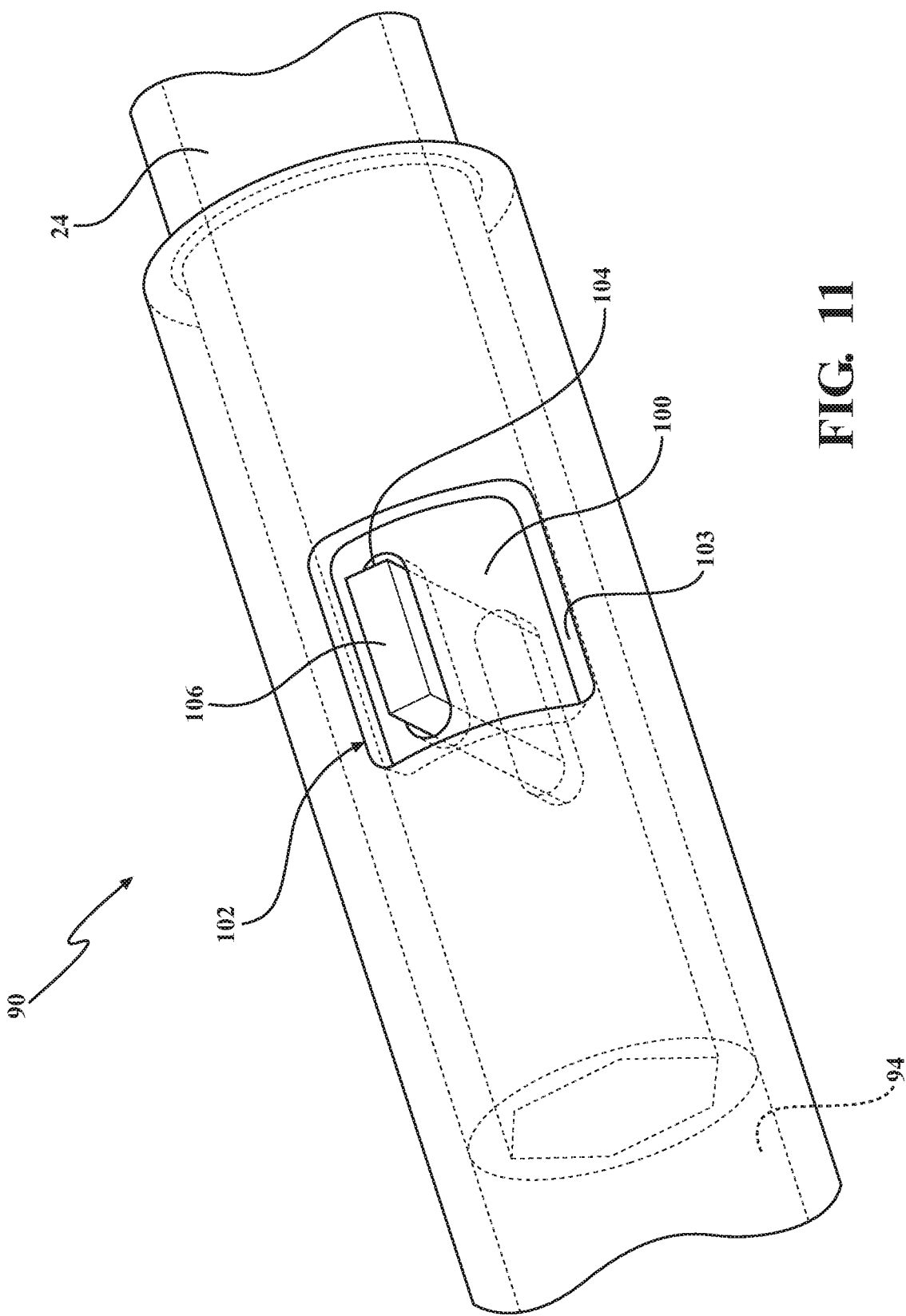
FIG. 11 is a perspective view of the clutch assembly of the present invention.
Figure 12:
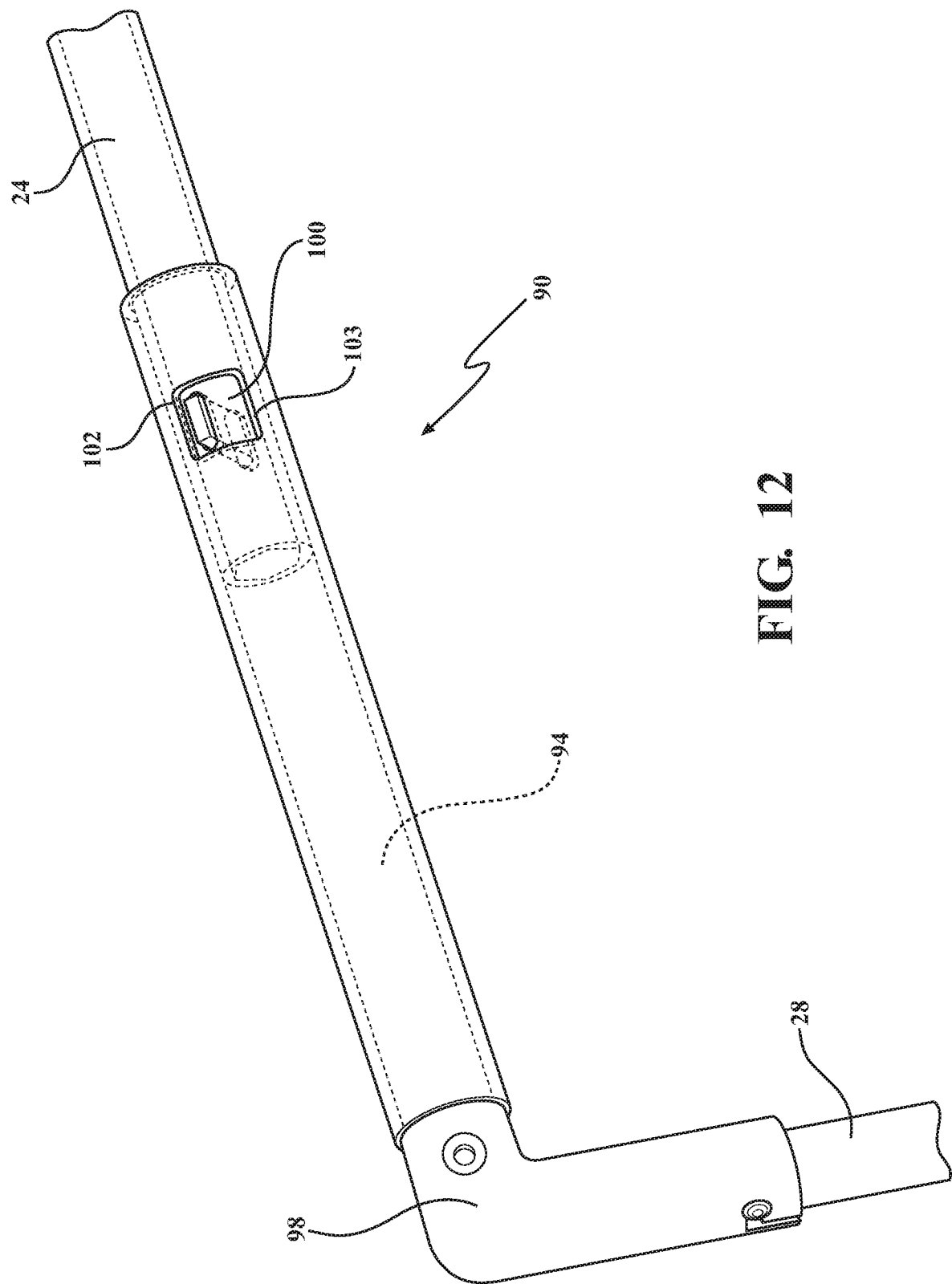
FIG. 12 is a further perspective view of the clutch assembly of the present invention.
Figure 13:
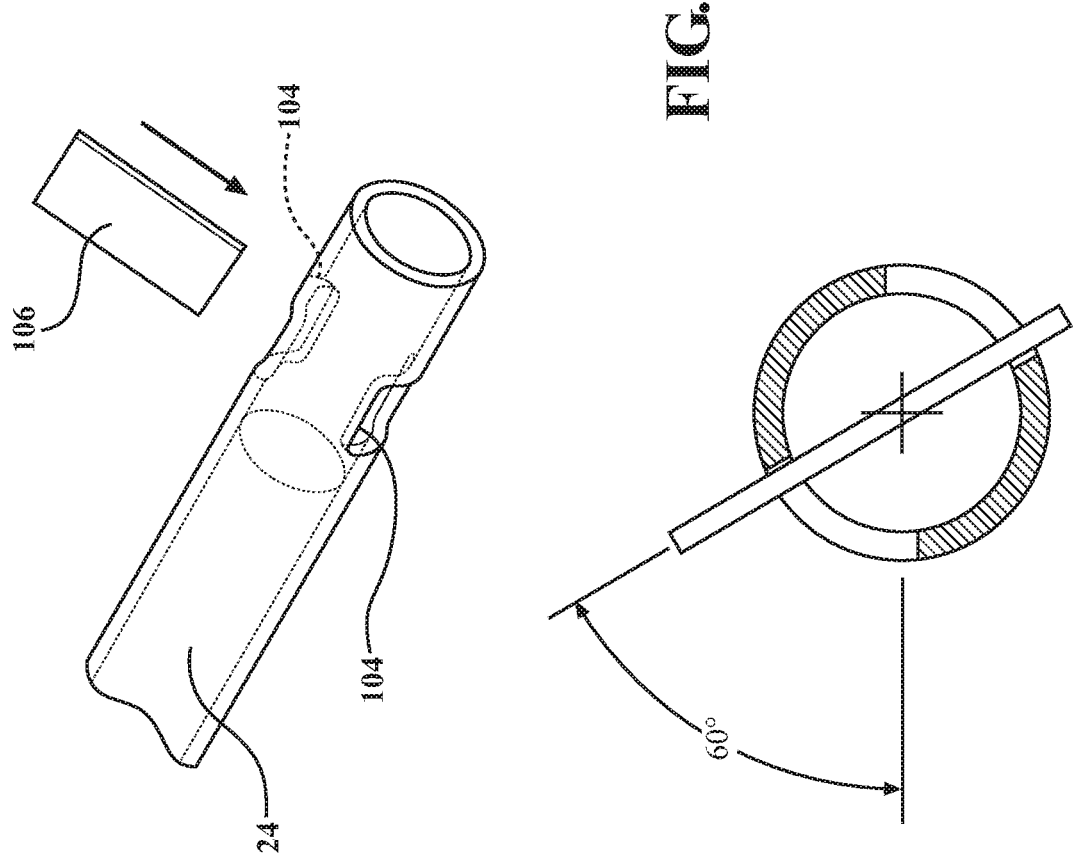
FIG. 13, is an exploded view of the clutch of the present invention.

With reference to FIGS. 11 to 13, the clutch assembly 90 of the present invention will be described. Clutch assembly 90 reduces the arc of rotation of the lever 28 required to raise and lower the dropdown assembly 4. The clutch assembly 90 reduces the arc of rotation by nearly 50% making the operation of the dropdown assembly 4 easier and more controllable for the operator.

The clutch assembly 90 includes a connecting tube 94 that extends between the lever 28 and the rotating bar 24. It should be appreciated by those ordinary skill in the art that tube 94 can be a separate tube connecting lever 28 and bar 24 or it can be integral with the elbow 98. Tube 94 has a window 100 extending through the wall of the tube 94. In the preferred embodiment the window 100 extends through the opposite walls of tube 94. In other words, the window 100 creates opposed openings on the opposite sides of tube 94. It should be appreciated that the window 100 could be on one side of the tube and would still function as desired. The window 100 has opposed engagement edges, a top edge of 102 and a bottom edge 103.

A slot 104 is provided in the bar 24. In the preferred embodiment, slot 104 extends through the bar 24, creating opposed slots 104. It should be appreciated that only a single slot 104 could be you used.

A key or bar 106 is inserted into the slot 104 and into the window 100 when assembled. The key 106 is shown as a rectangular piece, but it could also have a T-shape or other shapes at the end of the key 106 to keep it from inadvertently sliding out of slot 104. It should be appreciated by those of ordinary skill in the art that the key could be attached directly to the bar 24 by for example welding, or integrally formed with the bar 24 obviating the need for the slot 104.

Key 106 is adapted to engage the edges 102 and 103 of the window 100. When the lever 28 is pivoted by an operator, the key 106 engages either of the edges 102 or 103 to rotate the bar 24.

Figure 3:
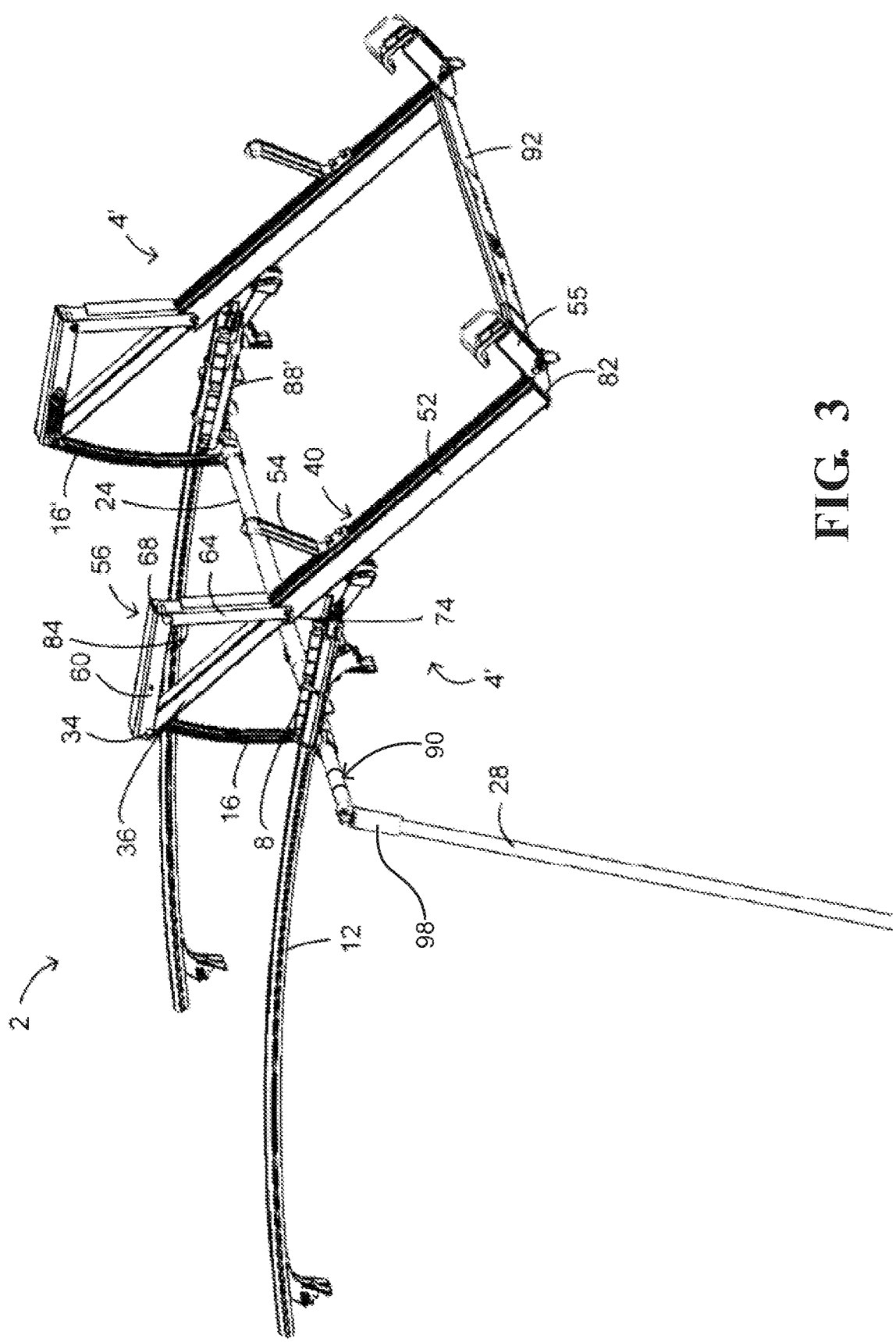
FIG. 3 is a perspective view of the drop-down utility rack in an intermediate position in accordance to one exemplary embodiment installed on a roof rack.
Figure 4:
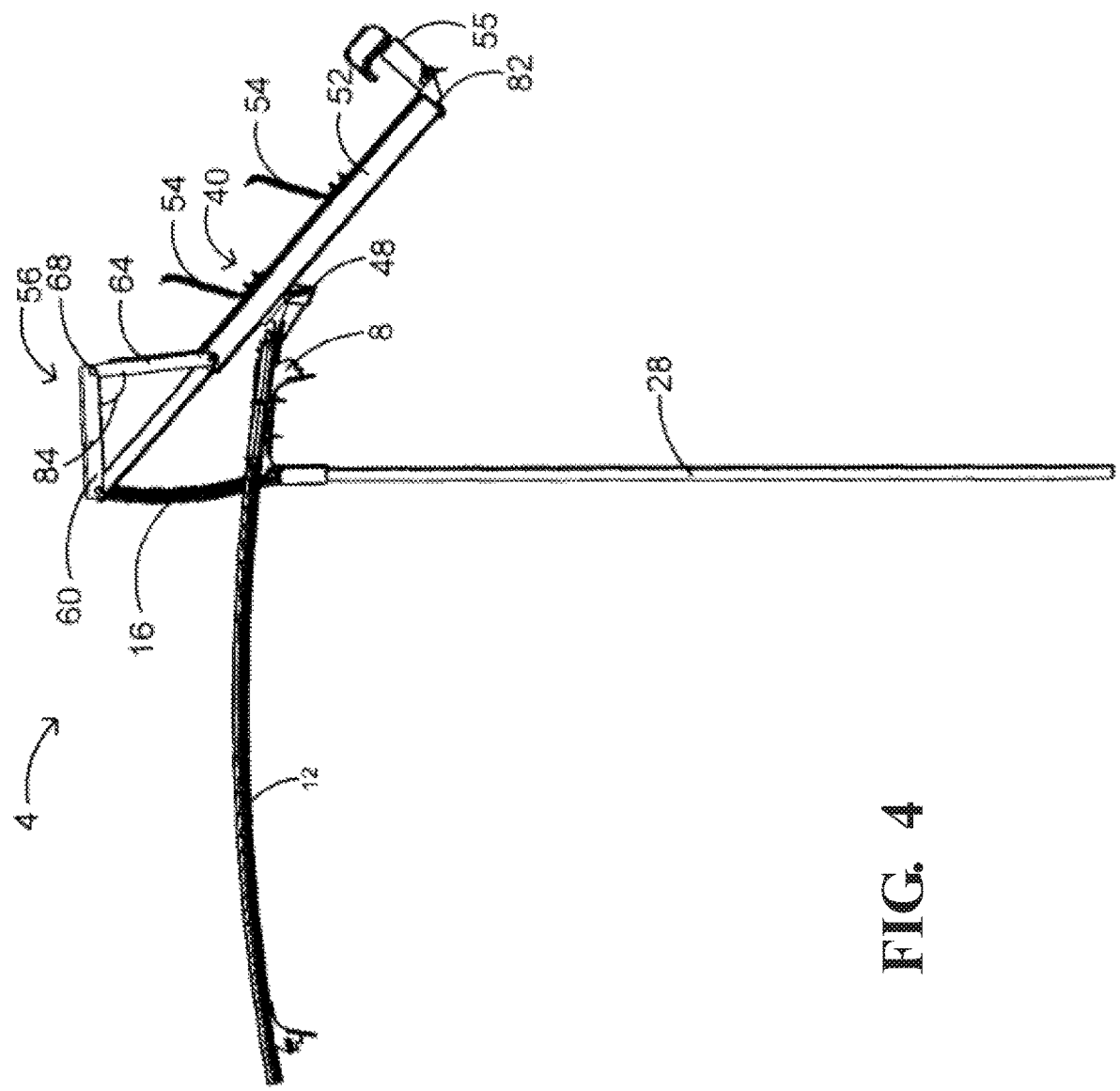
FIG. 4 is a side elevation view of the drop-down utility rack in an intermediate position in accordance to one exemplary embodiment.

In operation, an operator grasps the lever 28 and pivots it to rotate tube 94. When the ladder is moved from the stored or transport position shown in FIG. 5 to the lowered or access position shown in FIG. 9, the lever 28 is pivoted clockwise. The key 106 initially engages the top edge 102 of window 100. Clockwise movement of lever 28 causes the bar 24 to rotate clockwise through its initial arc of travel and actuating arms 16 to pivot upwardly. Once the pivot arms 16 are just beyond vertical or the intermediate position as shown in FIG. 3, the key 106 disengages, completing the arc of travel of lever 28 and disengaging lever 28 from bar 24. The rotating bar 24 continues to rotate clockwise allowing the ladder to move to the lowered position which then completes its arc of rotation. With the key 106 disengaged, there is nearly no force on the lever 28. The operator doesn't have to continue to push the lever 28, the dropdown assembly 4 moves under its own weight, just countered by the actuator 88 for smooth operation. The bar 24 continues to rotate due to the weight of the dropdown assembly moving to the access position. At the access position, the key 106 engages the bottom edge 103 of window 100 and bar 24 has completed its arc of rotation.

By rotating lever 28 counterclockwise, the key 106 engages the bottom edge of 103 of window 100 and rotates rotating bar 24 counterclockwise until the actuating arm 16 is over center. This is the return or transport arc of travel of lever 28 which is just a portion of the arc of travel of the rotating bar 24. At the over center position, the rotating bar 24 is free to rotate without moving the lever 28 through the final portion of its arc of rotation. The actuating arm and the dropdown assembly 4 continue to the stored or transport position though the force of the actuator 88, completing the arc of rotation of bar 24.

In this way, the lever 28 moves through a much smaller travel arc than previously required. This makes overall operation of the drop-down utility rack 2 easier and better controlled by the operator. It should be appreciated that the actuator 88 could be used to further shorten the arc of travel of the lever 28 if desired. In the disclosed embodiment, the arc of travel of lever 28 takes advantage of gravity at the over center position of actuating arm 16. However, actuator 88 could be used before the over center position to push and pull the utility rack 2 over center, shortening the arc of travel even further.

Figure 14:
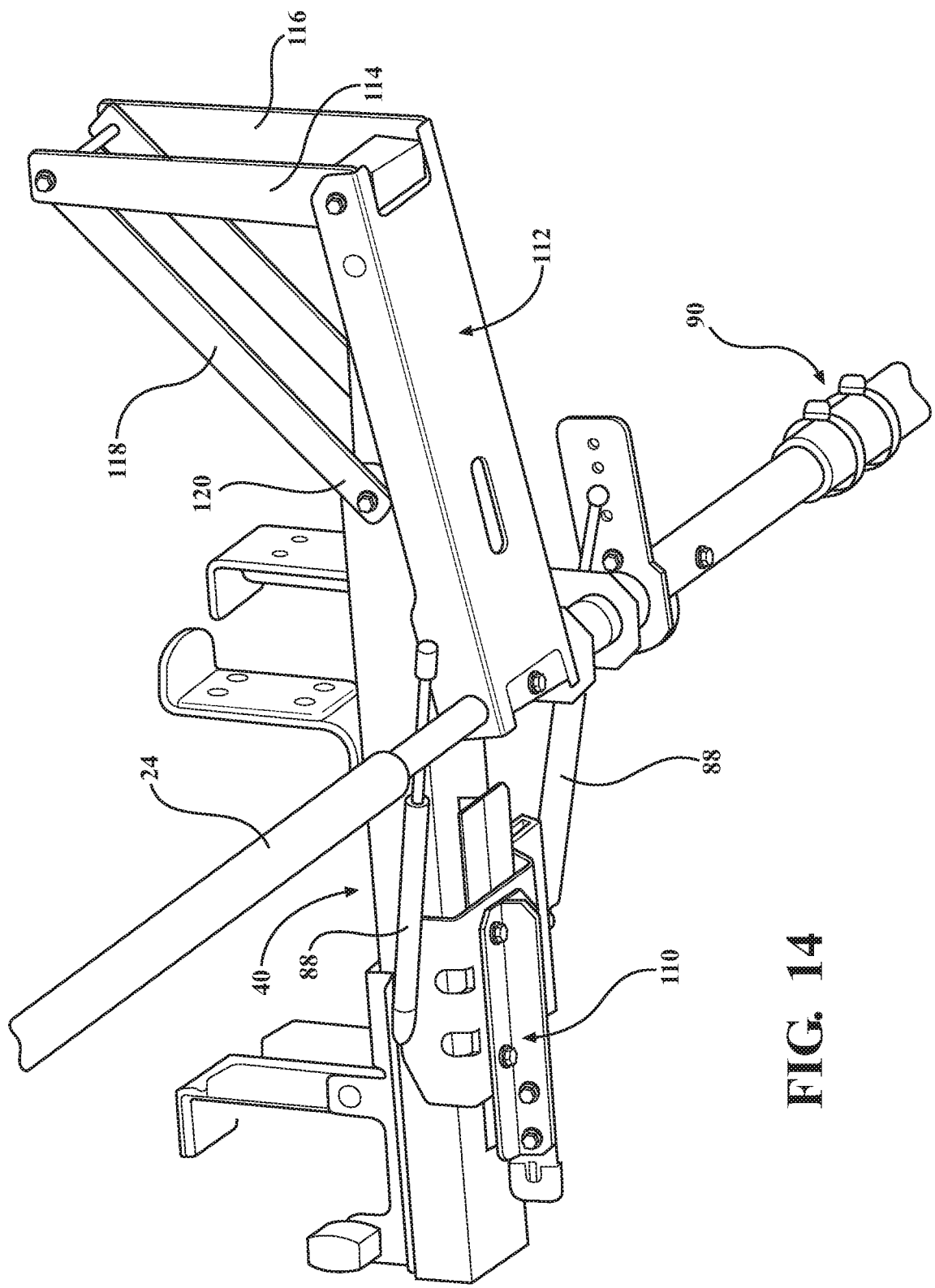
FIG. 14 is a further embodiment of the drop-down utility rack of the present invention.

With reference to FIG. 14, another embodiment of drop down utility rack 2 of the present invention is illustrated. In this embodiment, the base frame 8 has been replaced with a sheet metal assembly 110. The sheet metal assembly 110 is less costly and lighter than the cast base frame 8. The variable length arm 40 is supported on rollers. (not shown). The actuating arm 16 has been replaced with a bracket 112. The first arm 60 has been replaced with two support arms 114 and 116. The arms 64 have been replaced by a single bracket 118 with mounting ears 120.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed:

1. A drop-down utility rack comprising:
   a utility rack;
   a rotating bar connected to said utility rack, said rotating bar being rotatable through an arc of rotation which rotates said utility rack between a transport position and an access position, said arc of rotation having a first portion and a second portion;
   a lever connected to said rotating bar for rotating said rotating bar, said lever being movable through an arc of travel;
   a clutch mounted between said lever and said rotating bar, said clutch engaging and disengaging said lever and said rotating bar during said arc of rotation, said clutch engaging said lever and said rotating bar over said first portion of said arc of rotation, said lever rotating through said first portion of said arc of rotation, said clutch disengaging said lever and said rotating bar over said second portion of said arc of rotation, said lever not rotating through said second portion of said arc of rotation,
   whereby said utility rack can be rotated between said transport position and said access position by rotating said lever through an arc of travel over a portion of said arc of rotation, such that said lever rotates through said arc of travel to rotate said rotating bar over a portion of said arc of rotation, said clutch disengaging said lever from said rotating bar as said rotating bar completes its arc of rotation through said second portion of said arc of rotation, wherein said lever is not rotated.

2. The drop-down utility rack of claim 1, wherein said clutch automatically engages said lever and said rotating bar as said lever rotates through said arc of travel and rotates said rotating bar through said first portion of said arc of rotation, said clutch automatically disengages said lever and said rotating bar after said rotating bar has rotated through said first portion of said arc of rotation.

3. The drop-down utility rack of claim 2, wherein said clutch automatically disengages said lever and said rotating bar after said rotating bar has rotated through said first portion of said arc of rotation, said first portion of said arc of rotation being greater than said second portion of said arc of rotation.

4. The drop-down utility rack of claim 1, wherein said first portion of said arc of rotation is more than half the distance of the arc of rotation.

5. The drop-down utility rack of claim 1, wherein said lever has a window with opposed sides and said rotating bar has a key extending between said opposed sides; said key contacting one of said sides to rotate said lever and rotating bar together, said rotating bar freely rotating with respect to said lever when said key is between said sides.

6. The drop-down utility rack of claim 5, wherein said window extends through opposed walls of said lever, said rotating bar being received within said lever.

7. The drop-down utility rack of claim 6, further including a slot formed in said rotating bar, said key extending through said slot.

8. The drop-down utility rack of claim 1, wherein said clutch engages said lever and said rotating bar, said lever rotates through said arc of travel and rotates said rotating bar through a first portion of said arc of rotation, said clutch automatically disengaging said lever and said rotating bar after said rotating bar has rotated through said first portion of said arc of rotation.

9. The drop-down utility rack of claim 8, wherein said first portion of said arc of rotation is more than half of the arc of rotation.

10. The drop-down utility rack of claim 9, wherein said lever has a window with opposed sides and said rotating bar has a key extending between said opposed sides; said key contacting one of said sides to rotate said lever and rotating bar together, said rotating bar freely rotating with respect to said lever when said key is between said sides.

11. The drop-down utility rack of claim 10, wherein said window extends through opposed walls of said lever, said rotating bar being received within said lever.

12. The drop-down utility rack of claim 11, further including a slot formed in said rotating bar, said key extending through said slot.

13. A drop-down utility rack comprising:
a rotating bar for controlling the position of said utility rack between a transport position and an access position; said rotating bar rotating through an arc of rotation;
a lever connected to said rotating bar for rotating said rotating bar, said lever being movable through an arc of travel;
a clutch mounted between said lever and said rotating bar, said clutch engaging and disengaging said lever and said rotating bar such that said lever rotates through said arc of travel to rotate said rotating bar over a portion of said arc of rotation, said clutch disengaging said lever from said rotating bar as said rotating bar completes its arc of rotation.

14. A drop-down utility rack comprising:
a utility rack adapted for mounting upon the roof of a vehicle, said utility rack being moveable between a transport position on top of the vehicle and an access position along the side of the vehicle;
a rotating bar connected to said utility rack, said rotating bar being rotatable through an arc of rotation which rotates said utility rack between a transport position on the top of said vehicle and an access position along the side of said vehicle, said arc of rotation having a first portion and a second portion;
a lever connected to said rotating bar for rotating said rotating bar, said lever being movable through an arc of travel;
a clutch mounted between said lever and said rotating bar, said clutch engaging and disengaging said lever and said rotating bar during said arc of rotation to either raise said utility rack to the transport position of lower said utility rack to the access position, said clutch engaging said lever and said rotating bar over said first portion of said arc of rotation, said lever rotating said rotating bar through said first portion of said arc of rotation, said clutch disengaging said lever and said rotating bar over said second portion of said arc of rotation, said lever not rotating through said second portion of said arc of rotation,
whereby said utility rack can be rotated between said transport position and said access position by rotating said lever through an arc of travel over a portion of said arc of rotation, such that said lever rotates through said arc of travel to rotate said rotating bar over a portion of said arc of rotation, said clutch disengaging said lever from said rotating bar as said rotating bar completes its arc of rotation through said second portion of said arc of rotation, wherein said lever is not rotated.

15. The drop-down utility rack of claim 14, wherein said clutch automatically engages said lever and said rotating bar as said lever rotates through said arc of travel and rotates said rotating bar through said first portion of said arc of rotation, said clutch automatically disengages said lever and said rotating bar after said rotating bar has rotated through said first portion of said arc of rotation.

16. The drop-down utility rack of claim 15, wherein said clutch automatically disengages said lever and said rotating bar after said rotating bar has rotated through said first portion of said arc of rotation, said first portion of said arc of rotation being greater than said second portion of said arc of rotation.

17. The drop-down utility rack of claim 15, wherein said first portion of said arc of rotation is more than half the distance of the arc of rotation.

18. The drop-down utility rack of claim 14, wherein said lever has a window with opposed sides and said rotating bar has a key extending between said opposed sides; said key contacting one of said sides to rotate said lever and rotating bar together, said rotating bar freely rotating with respect to said lever when said key is between said sides.

19. The drop-down utility rack of claim 18, wherein said window extends through opposed walls of said lever, said rotating bar being received within said lever.

20. The drop-down utility rack of claim 19, further including a slot formed in said rotating bar, said key extending through said slot.

* * * * *